(12) United States Patent
Kao

(10) Patent No.: US 6,374,220 B1
(45) Date of Patent: Apr. 16, 2002

(54) N-BEST SEARCH FOR CONTINUOUS SPEECH RECOGNITION USING VITERBI PRUNING FOR NON-OUTPUT DIFFERENTIATION STATES

(75) Inventor: Yu-Hung Kao, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/353,969

(22) Filed: Jul. 15, 1999

Related U.S. Application Data

(60) Provisional application No. 60/095,394, filed on Aug. 5, 1998.

(51) Int. Cl.[7] .............................................. G10L 15/14
(52) U.S. Cl. ........................ 704/255; 704/256; 704/242
(58) Field of Search ................................ 704/242, 256, 704/255

(56) References Cited

U.S. PATENT DOCUMENTS

| | | | | |
|---|---|---|---|---|
| 5,241,619 A | * | 8/1993 | Schwartz et al. | 704/200 |
| 5,805,772 A | * | 9/1998 | Chou et al. | 704/255 |
| 6,236,962 B1 | * | 5/2001 | Kosaka et al. | 704/234 |

OTHER PUBLICATIONS

Richard M. Schwartz and Stephen C. Austin "A Comparison of Several Aproximate Algorithms for Finding Multiple (N–Best) Sentence Hypotheses," Proc. IEEE ICASSP 1991, vol. 1, pp. 701–704, Apr. 1991.*

Fred K. Soong and Eng–Fong Huang, "A Tree–Trellis Based Fast Search for Finding the N Best Sentence Hypotheses in Continuous Speech Recognition," Proc. IEEE ICASSP 1991, vol. 1, pp. 705–708, Apr. 1991.*

F. Richardson, M. Ostendorf, and J. R. Rohlicek, "Lattice–Based Search Strategies for Large Vocabulary Speech Recognition," Proc. IEEE ICASSP 1995, vol. 1, pp. 576–579, May 1995.*

Bach–Hiep Tran, Frank Seide, and Volker Steinbiss, "A Word Graph Based N–Best Search in Continuous Speech Recognition," Proc. 4th Intl. Conf. on Spoken Language, ICSLP 1996, vol. 4, pp. 2127–2130, Oct. 1996.*

C. J. Waters and B. A. MacDonald, "Efficient Word–Graph Parsing and Search With a Stochastic Context–Free Grammar," Proc. 1997 IEEE Workshop on Automatic Speech Recognition and Understanding, pp. 311–318, Dec. 1997.*

* cited by examiner

Primary Examiner—Tālivaldis Ivars Šmits
(74) Attorney, Agent, or Firm—Robert L. Troike; Frederick J. Telecky

(57) ABSTRACT

A method for N-best search for continuous speech recognition with limited storage space includes the steps of Viterbi pruning word level (same word, different time alignment, thus non-output differentiation) states and keeping the N-best sub-optimal paths for sentence level (output differentiation) states.

3 Claims, 3 Drawing Sheets

FIG. 4

CALL /k/ /ao/ /l/
41 42 43
44 44
45 45 45

GEORGE /jh/ /ao/ /r/ /jh/
47 47 47 49
49 49 51
51 51 53
53 53 53

WASHINGTON /w/ /aa/ /sh/ /ax/ /n/ /t/ /ax/ /n/
55 55 55 57
57 57 59
59 59 61
61 61

FIG. 5

SPEECH → EXPAND ALL ACTIVE PATHS (101) → COMPUTE AND COMPARE AND STORE SLOTS AND ADD POINTERS TO SUB-OPTIMAL PATHS (103)

MODEL → (103)

→ IS THIS A SENTENCE LEVEL STATE? (105)

NO → DO VITERBI DECODING AND PRUNNING. REMOVE ALL PATHS BUT BEST SCORE PATH (106)

YES → KEEP BEST AND SUB-OPTIMAL PATHS n-BEST (107) → SELECT BEST PATH SCORE OF n-BEST AT END OF UTTERANCE (109)

(OUTPUT DIFFERENTIATION STATE?) [dashed]

HISTOGRAM FOR PEAK SLOT USAGE, SINGLE WORD MILITARY ALPHABET TASK

STRING TASK

N-BEST SEARCH FOR CONTINUOUS SPEECH RECOGNITION USING VITERBI PRUNING FOR NON-OUTPUT DIFFERENTIATION STATES

This application claims priority under 35 USC §119(e)(1) of provisional application No. 60/095,394, filed Aug. 8, 1998.

TECHNICAL FIELD OF THE INVENTION

This invention relates to speech recognition and more particularly to perform N-best search with limited storage space.

BACKGROUND OF THE INVENTION

Speech recognition involves searching and comparing the input speech to speech models representing vocabulary to identify words and sentences.

The search speed and search space for large vocabulary speech recognition has been an active research area for the past few years. Even on the state-of-the-art workstation, search can take hundreds of times real time for a large vocabulary task (20K words). Most of the fast search algorithms involve multi-passes of search. Namely to use simple models (e.g. monophones) to do a quick rough search and output a much smaller N-best sub-space; then use detailed models (e.g. clustered triphones with mixtures) to search that sub-space and output the final results (see Fil Alleva et al. "An Improved Search Algorithm Using Incremental Knowledge for Continuous Speech Recognition," ICASSP 1993, Vol. 2, 307–310; Long Nguyen et al. "Search Algorithms for Software-Only Real-Time Recognition with Very Large Vocabulary," ICASSP; and Hy Murveit et al. "Progressive-Search Algorithms for Large Vocabulary Speech Recognition," ICASSP). The first pass of using monophones to reduce the search space will introduce error, therefore the reduced search space has to be large enough to contain the best path. This process requires a lot of experiments and fine-tuning.

The search process involves expanding a search tree according to the grammar and lexical constraints. The size of the search tree and the storage requirements grow exponentially with the size of the vocabulary. Viterbi beam search is used to prune away improbable branches of the tree; however, the tree is still very large for large vocabulary tasks.

Multi-pass algorithm is often used to speed up the search. Simple models (e.g. monophones) are used to do a quick rough search and output a much smaller N-best sub-space. Because there are very few models, the search can be done much faster. However, the accuracy of these simple models are not good enough, therefore a large enough N-best sub-space has to be preserved for following stages of search with more detailed models.

Another process is to use lexical tree to maximize the sharing of evaluation. See Mosur Ravishankar "Efficient Algorithms for Speech Recognition," Ph.D. thesis, CMU-CS96-143, 1996. Also see Julian Odell "The Use of Context in Large Vocabulary Speech Recognition," Ph.D. thesis, Queens' College, Cambridge University, 1995. For example, suppose both bake and baked are allowed in a certain grammar node, much of their evaluation can be shared because both words start with phone sequence: /b//ey//k/. If monophones are used in the first pass of search, no matter how large the vocabulary is, there are only about 50 English phones the search can start with. This principle is called lexical tree because the sharing of initial evaluation, and then the fanning out only when phones differ looks like a tree structure. The effect of lexical tree can be achieved by removing the word level of the grammar, and then canonicalize (remove redundancy) the phone network. For example:

% more simple.cfg
start(<S>).
<S>- - - > bake| baked.
bake - - - > b ey k.
baked - - - > b ey k t.
% cfg_merge simple.cfg| rg_from_rgdag| \
   rg_canonicalize
start(<S>).
<S>- - - > b, Z_1.
Z_1 - - - > ey, Z_2.
Z_2 - - - > k, Z_3.
Z_3 - - - > t, Z_4.
Z_3 - - - > " ".
Z_4 - - - > " ".

The original grammar has two levels: sentence grammar in terms of words, and pronunciation grammar (lexicon) in terms of phones. After removing the word level and then canonicalizing the one level phone network, same initial will be automatically shared. The recognizer will output phone sequence as the recognition result, which can be parsed (text only) to get the word. Text parsing takes virtually no time compared to speech recognition parsing.

It is desirable to provide a method to speed up the search and reduce the resulting search space that does not introduce error and can be used independently of multi-pass search or lexical tree.

SUMMARY OF THE INVENTION

In accordance with one embodiment of the present invention, an N-best search process with little increase in memory space and processing is provided by Viterbi pruning word level states to keep best path but also keeping sub-optimal paths for sentence level states.

DESCRIPTION OF THE DRAWINGS

FIG. 4 illustrates expansion of a sentence;

FIG. 5 is a flow chart of the present invention;

DESCRIPTION OF PREFERRED EMBODIMENTS OF THE PRESENT INVENTION

Figure 1:
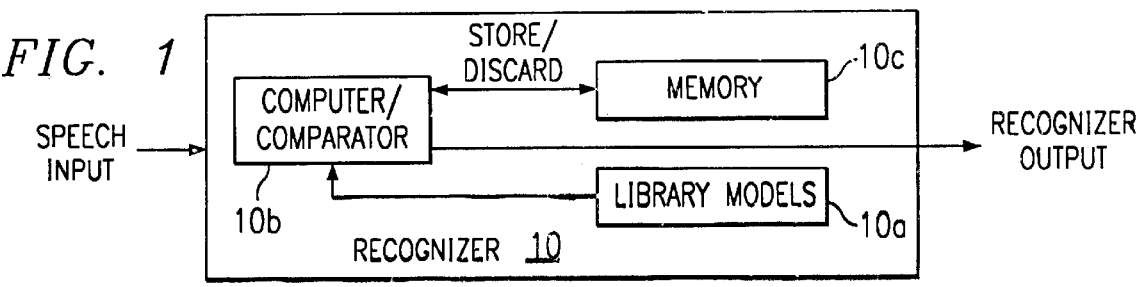
FIG. 1 is a block diagram of the system according to one embodiment of the present invention.
Figure 2:
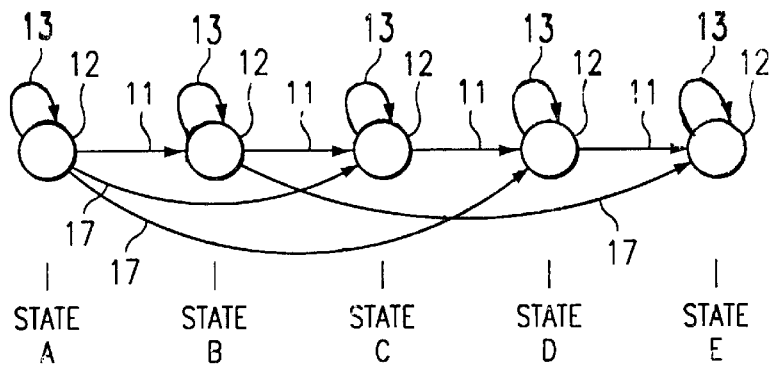
FIG. 2 illustrates states and transitions.

Referring to FIG. 1, there is illustrated a speech recognition system 10. The recognizer 10 includes a library 10a including a pronunciation dictionary, grammars, acoustic models, etc. The recognizer 10 further includes a computer/comparator 10b for comparing parsed input speech to the models and for computing a score and memory 10c for storing operation program and storing results from comparing and computing results. The parsed speech input is compared to speech models and the match produces the recognized output. The framework of our recognition system is HMM (Hidden Markov Model) where the sentence grammar is represented by a Markov model with states 12 and transitions 11 among states (see FIG. 2). Transitions are associated with words. When a transition is taken from state A to state B, one of the words associated with that transition must be evaluated. Then from state B, there are again many outgoing transitions to choose from, each transition has words associated with it. Taking a transition means going through a word. This Markov model thus describes what words a sentence can start with, what words follow what words, and what words a sentence can end with. This is a computational representation of a grammar.

Each word is also represented by a Markov model with states and transitions. Acoustics are associated with each state. Transition into a state means evaluating the acoustics associated with that state. Usually a left-to-right HMM is used for word model, there are straight-through transitions 11 representing average speed of speaking, self-loop transitions 13 representing slow speed, and skip transitions 17 representing fast speed. Acoustics can also be associated with transitions (as in sentence HMM); however, in most speech recognition systems the acoustics are associated with states for its simplicity.

These two levels of HMM's describe the search space of a speech recognition system (see Y. H. Kao, W. Anderson, H. S. Lim, "A Multi-Lingual, Speaker-Independent, Continuous-Speech Recognizer on TMS320C5x Fixed-Point DSP," ICSPAT 1997, San Diego, USA and Y. H. Kao, "Fixed-Point Implementation of IG Speech Recognizer on C5x DSP," TI Tech Report, 1996). From the top level sentence grammar to the bottom level acoustics, the recognition algorithm (parser) can run the input acoustic vectors through this search space to find out the best path by building a search network. The best path found at the end of the input vectors is the recognition result. Grammars can be represented by context-free-grammar (for small vocabulary tasks) or N-Gram (for large vocabulary tasks). In a large vocabulary system, usually a three level system (sentence, word, phone) is used rather than the two level system (sentence, word). It is impossible to build individual word models for so many words, therefore, phonetic models are used as the base units (see Y. H. Kao, K. Kondo, "Phonetic Modeling Using Acoustic Decision Tree," TI Tech Report, 1997; Y. H. Kao, "Acoustic Decision Tree: A Tutorial," TI Tech Report, 1997; Y. H. Kao, "Acoustic Decision Tree: Performance Analysis," TI Tech Report, 1997).

Figure 3:
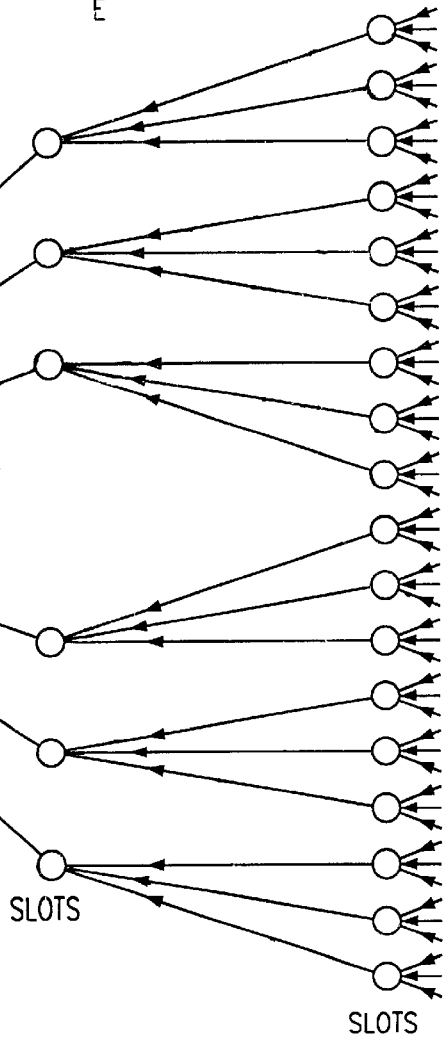
FIG. 3 illustrates path expansion slots and pointers back to previous slots.

Search is expanding all the possible paths in the grammar (see FIG. 3). When a speech frame comes in, first we expand all the possible word in the sentence HMM. To expand each word, we need to expand their individual phone sequence in the lexicon HMM. To expand each phone, we need to expand their phonetic HMM's, which has acoustics as the observations. There are three levels of HMM in-the structure. The upper level transitions may take more than one speech frame, only the bottom level transitions consume exactly one speech frame. A speech frame is, for example, 20 milliseconds long. The upper level transition can be taken only after its corresponding observation is completed (which may take several speech frames).

Speech recognition is to expand a search network following the grammar-word search space definition. There are many ways of actually defining the computer data structure and implementing the algorithm. We will use our algorithm as an example and describe the ways to minimize the network.

We define a structure called slot as the building block of the search network. Using a C structure, it is defined as:

```
struct slot {
    int        model_index;
    int        state_index;
    float      score;
    struct     slot *backptr;
    int        time;
    int        last_time;
    struct     slot *next_state;
    struct     slot *next_word;
}
```

Model_index is an integer representing what model this slot is at. For example, the whole search space is represented by one sentence model, we assign model_index 0 to the sentence model. This sentence model is composed of many words and how these words can be put together, we assign model_index 1, 2, 3, . . . etc. for each of the word models. Model_index can not overlap, each index represents a different model (sentence or words).

State_index is an integer representing what state (in a model, be it sentence or words) this slot is at. Both sentence and word models are HMM's, they are evaluated state by state. When building the search network, we need to know which state we are at, so we know what next state(s) to transition to. Within each model, state_index starts from 1, 2, 3, . . . etc. State 1 in model 1 is different from state 1 in model 2.

Score is the accumulated score of this path up to this slot.

Backptr is a pointer that points back to the previous slot in the path. For example, if state 10 can come from state 9 (straight-through transition), or state 8 (skip transition), or state 10 (self-loop transition); after Viterbi decoding which keeps only the best path coming into a state, the backptr of the state 10 slot will point to one of the three slots described above.

Time is the time index when this slot is first created. For example, we use 20 ms frame length. The input speech is segmented into 20 ms frames, preprocessed to extract a feature vector, then fed into the search algorithm. During the search of the first frame (0–20 ms), time is 1; during the search of the second frame (20–40 ms), time is 2, it goes on like this.

Last_time is the last time this path is updated. We need this time stamp for slot management (garbage collection). Expansion of the search network is an exponential growth problem, bad scored paths have to be pruned to reduce the size of search network. When a path has good score and should be retained for future expansion, we propagate the current time stamp backward through the whole path (a path is a backward linked list of slots). If the last_time of a slot is the current time, it must be retained and can not be reused. Otherwise, it can be reused because its path is not within the search beam and thus last_time not updated.

Next_state points to the next slot of active state within this model to be evaluated. When evaluating a model, many states can be active and need to be evaluated, they are linked together by next_state.

Next_word points to the next slot of active word for this sentence state to be evaluated. When evaluating a sentence model, its slots of active states are linked by next_state. But for each state, it has words that are still being evaluated (a word needs more than one frame to complete). Next_word links all these pending word evaluation slots. Next_word will start from a sentence level slot.

Search is the most complicated part of the speech recognition algorithm. The best way to learn the algorithm is to trace the C code. Please refer to our well commented C code and a companion documentation (see Y. H. Kao, "IG (Integrated Grammar) Algorithm," TI Tech Report, 1996).

FIG. 4 illustrates an example of the search space for the sentence grammar "Call George Washington," The layers of grammars are sentences, words, phones and acoustic distributions (bottom layer) represented by the small circles. The expansion goes from word "call" to phone "|K|" to the top three circles 41–43 for the acoustics of "|K|". The expansion then goes to the second phone "|ao|" to the five circles 44 and then back to the phone "|l|". The expansion then goes to the acoustics for "|l|" represented by the small circles 45. After the last circle 45, the expansion goes to the word "George" then to the phone "|jh|". The expansion continues with the three acoustics 47, then the phone "|ao|" and then the five acoustics 49. After the last acoustic 49, the search goes to the phone "|r|", followed by the four acoustics followed by the phone "|jh|", followed by the three acoustics 53. The last acoustic 53 is followed by the word "Washington" followed by the phone "|w|". This is followed by the three acoustics 55. The acoustics 55 are followed by the phone "|ao|" followed by the five acoustics 57, followed by the phone "|sh|". The phone "|sh|" is followed by its four acoustics 59, followed by the phone "|ax|" and its three acoustics 61. The expansion continues similarly for the phones "|n|", "|t|", "|ax|" and "|n|" followed by their associated three acoustics.

For the sake of continuing our discussion, we will describe the idea of search in a high level, and then explain the N-best search process.

After defining the slot data structure as the building block of the search network, it is straightforward to do the search network expansion. It can be summarized as:
Build slots for all the sentence states where a sentence can start with For (each input acoustic vector) {

For (each sentence state slot) {

Find all the words that are associated with its outgoing transition build word start slots and maintain still-in-evaluation word slots For (each word state slot){

Transition to next state and evaluate an acoustic vector

If (reach word end) {
        Pass the info to sentence level for next sentence state transition
      }
    }
  }
}
Back-trace the best score path and report recognition result For each input acoustic vector (20 ms), we have to traverse down the search space as shown, for example, in FIG. 4 to reach the bottom layer so an acoustic evaluation can be done. The acoustic score and the transition score are accumulated and stored in the score field of the slot (put in storage 10c of FIG. 1). The backptr field points to previous slot (where this slot comes from). Therefore, for each input acoustic vector, the evaluation will add at least one slot to the search path because one acoustic evaluation has to be done. Sometimes more than one slot has to be added to the path because sentence level slot has to be added before the acoustic evaluation slot can be added.

This is called trace mode, every input acoustic vector is mapped into a model acoustic vector and recorded in the search path. It is very expensive because a very long liked list of slots is created. For example, a 5-second input utterance has 5×50=250 input vectors. A linked list of more than 250 slots has to be created for every possible theory within the search beam width.

For training purpose, this is necessary because every input vector needs to be mapped to a model vector in order to update that model vector. But for recognition purpose, this is an overkill because we only want to know what words are recognized. We do not need to know the microscopic trail of how each vector is mapped.

For isolated word recognition, Dynamic Time Warping (DTW) type of algorithms are used; N-Best is actually trivial. Because each word (or whatever unit) is evaluated independently, you can get the scores for all the words that are not pruned. N-Best is as easy as sorting those scores.

For continuous speech recognition with a relatively small number of output combinations; N-Best is also trivial. For example, the recognition of company names, each name consists of a few words, has a limited number of output combinations (the number of companies). These company names can be evaluated in separate search paths, and the scores compared in the end to output N-Best results. It is very similar to how N-Best is done in DTW.

It is for the combinatorially explosive continuous speech recognition, such as 1-digit recognition, that N-Best becomes an issue. For a 10-digit, continuous speech recognition task, there are $10^{10}$=10 billions of possible output strings. We can not afford to evaluate these 10 billion search paths separately because it is way too many. There must be something done in the search process to retain the suboptimal paths economically in order to solve this problem.

In accordance with the present invention, as illustrated by the flow chart of FIG. 5, all active paths are expanded (step 101) and in step 103 we compute and compare and store slots. We then determine if this is a sentence level state (step 105) and if not we do Viterbi decoding and pruning (step 106). If it is a sentence level state, we keep the best sub-optional paths (step 107) and after utterance select the best path (step 109).

Because the search in speech recognition is an exponential growth problem, two methods are used to control its huge size: Viterbi decoding and pruning. Pruning discards paths with scores outside of the search beam. It is fine for N-Best purpose because the paths pruned away are unlikely to be the top contenders in the end. On the other hand, Viterbi decoding keeps only the best path coming into a state because we are only interested in finding the best path in the end. For N-Best output, Viterbi decoding is not good because we are not only interested in the best path, but also second best, third best, . . . etc.

Viterbi decoding is a key idea in reducing the search network size. For example, suppose there are two paths coming into a state. Viterbi decoding says that because the future expansion of the paths only depends on this state, we only need to keep the best scored incoming path for future expansion. Because the future expansions are the same for these two incoming paths, the lower scored path will always maintain the same losing margin even if we continue the expansion for it. Therefore, because our purpose is to get the best scored path, only the best scored incoming path for a state needs to be expanded.

Viterbi decoding is a simple and yet very powerful idea in the search for the best path. Suppose there are in average three paths coming into a state, to process a one second utterance (50 frames×20 ms), Viterbi decoding reduces the number of paths from $3^{50}$ to 1. It is a huge reduction, and something we can not do without.

However, for N-Best output, we need to keep the sub-optimal paths. But to do that for all the states, even the minimum of keeping one sub-optimal path, means $2^{50}$ paths for one second of utterance. It certainly sounds like an astronomical proposition!

Fortunately, it is not necessary to keep multiple paths for most of the states. For most states, we still do Viterbi decoding; only for the much smaller number of output differentiation states Viterbi decoding does not apply and multiple paths are retained as illustrated by dashed lines in FIG. 5.

In our recognizer, output differentiation states means sentence level states. Only in the sentence level states will different paths result in different outputs. In the word level states, different paths mean different time alignment of the acoustics, it is still the same word no matter how the acoustics are aligned within the models. We are only interested in N-Best output, not N-Best time alignment. Therefore, there is no need to keep sub-optimal paths for word level states because all those sub-optimal paths represent the same word.

On the other hand, for sentence level states, each path (transition) represents a different word. That is exactly where we want to keep the sub-optimal paths.

We have established that non-Viterbi (keep sub-optimal) decoding is only done at sentence level states (step 107). Viterbi decoding is still done at word level states (step 106). Fortunately, most of the states we encounter in search are word level states. For example, for a single word recognition task, suppose the input utterance consists of 0.5 second silence+0.5 second word+0.3 second silence. There are totally 1.3 seconds/20 ms=65 frames. Of the more than 65 state evaluations for any path (65 states map to acoustics plus some sentence level states), only two are non-Viterbi because there are only two sentence level states. The other 65 or so state evaluations are still Viterbi. Because of the small percentage of non-Viterbi states, the increase in search complexity is very small.

In order to retain the sub-optimal paths at sentence level states, one slot pointer is added to the slot data structure as shown in step 103.

```
struct slot {
    int           model_index_and_state_index;
    float         score;
    struct slot   *backptr;
    struct slot   *next_state;
    struct slot   *next_word;
    struct slot   *next_nbest;      /* pointer to sub-optimal path */
}
```

When incoming paths merge at a sentence level states, we do not just keep the best path, we also keep the sub-optimal paths which are linked by next_nbest.

After keeping those sub-optimal paths by linking them through next_nbest pointers, the forward expansion of the network stays the same. The scores are accumulated to the best path only. The score differences between the best path and all the sub-optimal paths for a state stay constant, there is no need to expand the sub-optimal path separately. At the end of the utterance, in addition to the best path, sub-optimal paths can also be back traced. These are the N-Best outputs.

Not all the paths coming into a sentence level state are worth keeping. Some paths differ only in silence, some paths have the same output as the existing ones; for these we only keep one best scored path.

Although the sup-optimal paths do not need to be expanded forward, they do need to be back traced at every frame to prevent being reused and destroyed.

We calibrated the peak slot usage on two tasks: single word military alphabet recognition (7087 files) and 10 continuous digits recognition (1390 files).

Two conditions were run for these two tasks:

Optimally minimized one-best search network.

N-Best search, as described in this paper.

Figure 6:
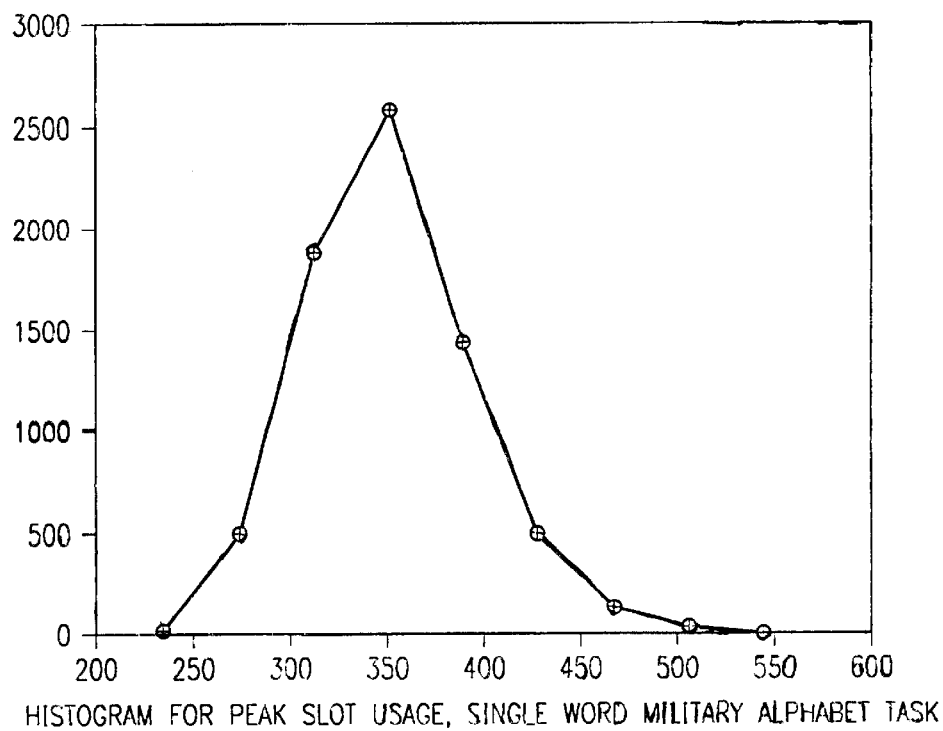
FIG. 6 is a histogram for peak slot usage, single word military alphabet task.

Peak slot usage histograms are plotted in FIG. 6. In the plots, they are represented by circle and plus respectively. The X-axis is the peak slot count, the Y-axis is the number of utterances that requires minimum X-axis slots to be successfully parsed. The more left the distribution is, the more efficient the search is.

For the single word military alphabet- recognition task, the max, mean, and standard deviation of the peak slot usage are:

|          | Max | Mean | std-dev |
|----------|-----|------|---------|
| Optimal One-Best | 602 | 351 | 43 |
| N-Best   | 602 | 351 | 43 |

For the 10 continuous digits recognition task, the max, mean and standard deviation of the peak slot usage are:

|          | max  | Mean | std-dev |
|----------|------|------|---------|
| Optimal One-Best | 2308 | 638 | 216 |
| N-Best   | 2596 | 663 | 232 |

The N-Best search network increases less than 10% of the peak slot usage compared to the single-best minimized network for the 10-digit recognition task. For the single word military alphabet recognition task, there is no increase at all in peak slot usage.

Figure 7:
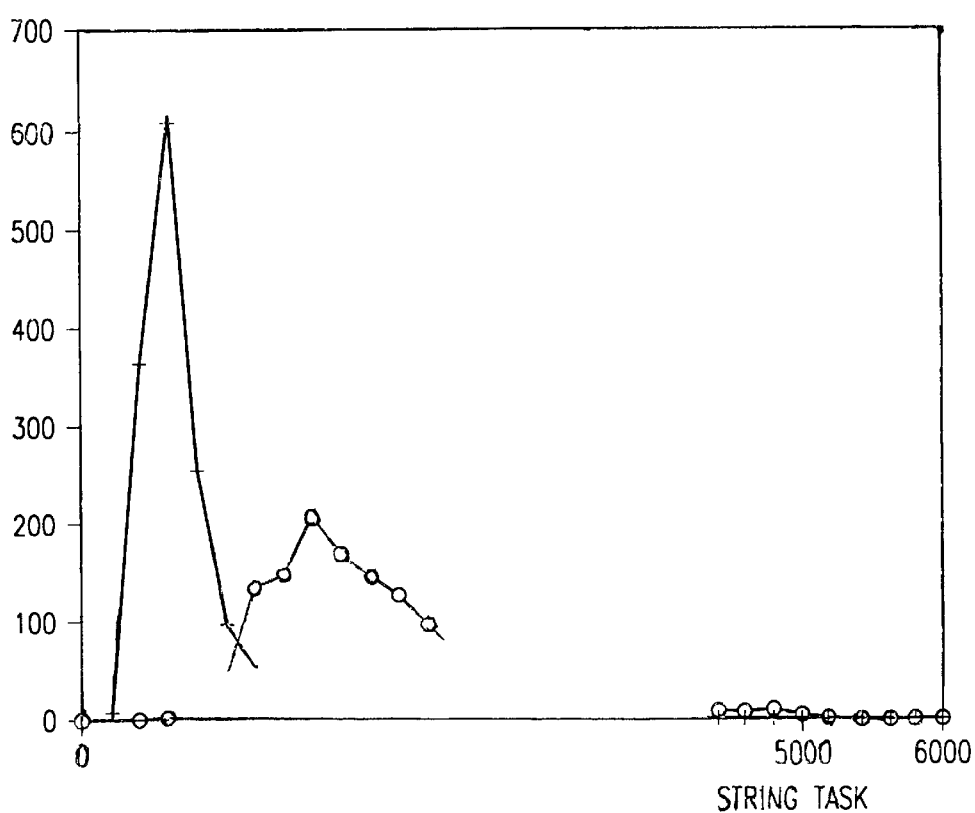
FIG. 7 is a histogram for peak slot usage, 10-digit task.

From the histogram plots of FIG. 7, we need 500 slots, 500×6=3K word RAM, for the N-Best military alphabet task. And 1500 slots, 1500×6=9K word RAM for the N-Best 10-digit string task. Basically the peak slot usage stays the same, but the slot size increases from 5 fields to 6 fields.

The time was calibrated on SUN Ultra Sparc due to the N-Best DSP implementation is not completed at -the time of this writing.

For the single word military alphabet recognition task, the real time factors are:

|          | xRT |
|----------|-----|
| Optimal One-Best | 0.028197 |
| N-Best   | 0.042225 |

For the 10 continuous digits string recognition task, the real time factors are:

|          | xRT |
|----------|-----|
| Optimal One-Best | 0.046995 |
| N-Best   | 0.099254 |

The increase for military alphabet task is 1.5 times. The increase for 10-digit task is 2.11 times. This is due to we have to back trace all the sub-optimal paths.

The N-Best outputs are ordered by score. All scores are negative (because of accumulating negative log probabilities). The more positive the score is the better. Score difference of all the sub-optimal paths with regard to the best path is also printed.

For a correct recognition, you can see all the common confusion pairs: four-one, five-nine, zero-oh, eight-three, one-oh, oh-four.

| A:    |          | one  | nine | oh   | three | oh   | nine | nine | four | oh   | nine |
|-------|----------|------|------|------|-------|------|------|------|------|------|------|
| R:    |          | one  | nine | oh   | three | oh   | nine | nine | four | oh   | nine |
| NB 0: | −0.01908 | one  | nine | oh   | three | ONE  | nine | nine | four | oh   | nine |
| NB 1: | −0.02311 | one  | nine | ZERO | three | oh   | nine | nine | four | oh   | nine |
| NB 2: | −0.02824 | one  | nine | oh   | EIGHT | oh   | nine | nine | four | oh   | nine |
| NB 3: | −0.02973 | FOUR | nine | oh   | three | oh   | nine | nine | four | oh   | nine |
| NB 4: | −0.03508 | one  | nine | oh   | three | oh   | nine | nine | four | FOUR | nine |
| NB 5: | −0.03663 | one  | FIVE | oh   | three | oh   | nine | nine | four | oh   | nine |
| NB 6: | −0.03803 | one  | nine | oh   | three | oh   | nine | nine | OH   | oh   | nine |

For an incorrect recognition, chances are the correct answer will be in the N-Best list.

| A:    |          | four | one  | two  | nine | four | one  | three | seven | five | nine  |
|-------|----------|------|------|------|------|------|------|-------|-------|------|-------|
| R:    |          | four | one  | two  | nine | OH   | one  | three | seven | five | nine  |
| NB 0: | −0.00256 | four | one  | two  | nine | four | one  | three | seven | five | nine  |
| NB 1  | −0.00953 | OH   | one  | two  | nine | oh   | one  | three | seven | five | nine  |
| NB 2: | −0.01039 | four | one  | two  | nine | oh   | OH   | three | seven | five | nine  |
| NB 3: | −0.01563 | four | one  | two  | nine | oh   | one  | three | seven | five | SEVEN |
| NB 4: | −0.01797 | four | one  | two  | nine | oh   | one  | TWO   | seven | five | nine  |
| NB 5  | −0.02224 | four | one  | two  | FIVE | oh   | one  | three | seven | five | nine  |
| NB 6: | −0.02330 | four | FOUR | two  | nine | oh   | one  | three | seven | five | nine  |
| NB 7: | −0.02519 | four | one  | two  | nine | oh   | one  | three | SIX   | five | nine  |
| NB 8: | −0.03004 | four | one  | two  | nine | oh   | one  | three | seven | OH   | nine  |

There are many applications of N-Best outputs. For example:

Dialog system. The output of a speech recognition system is passed on to a dialog system in order to carry on an interactive transaction. Because of possible errors in a speech recognition system, N-Best provides a collection of likely recognition results, then the dialog system can resolve the contusion by a analyzing long distance semantics.

Rejection. The score difference between the best path and the second best path can be used as a confidence measure. Large winning margin means the recognition is more reliable; while small winning margin means they are probably confusable and should be rejected.

Multi-pass fast search. Less detailed models (smaller and thus faster to evaluate. e.g. monophone) are used to generate an N-Best lattice sub-space quickly; then more detailed models (larger and more accurate e.g. context-dependent phones) are used to search this greatly reduced sub-space. This is a divide-and-conquer strategy. A complex problem can be solved by splitting it into smaller problems. N-Best provides the latitude for such a multi-step process.

N-Best can be a mean towards many ends. It is not just outputting multiple answers.

What is claimed is:

1. A method of performing N-best speech recognition searching comprising the steps of:

Viterbi pruning non-output differentiation states to keep the best path; and keeping N-best sub-optimal paths for output differentiation states where different paths result in different outputs.

2. The method of claim 1 wherein non-output differentiation states are word level states.

3. The method of claim 1 where said output differentiation states are sentence level states.

* * * * *